US008031874B2

(12) United States Patent
Park

(10) Patent No.: US 8,031,874 B2
(45) Date of Patent: Oct. 4, 2011

(54) STATION AND METHOD OF COLLECTING INFORMATION CORRESPONDING TO SECURITY IN A WIRELESS NETWORK

(75) Inventor: Sung-joon Park, Suwon-si (KR)

(73) Assignee: Samsung Electronics Co., Ltd., Suwon-Si (KR)

(*) Notice: Subject to any disclaimer, the term of this patent is extended or adjusted under 35 U.S.C. 154(b) by 1025 days.

(21) Appl. No.: 11/703,729

(22) Filed: Feb. 8, 2007

(65) Prior Publication Data

US 2008/0037786 A1   Feb. 14, 2008

(30) Foreign Application Priority Data

Aug. 9, 2006 (KR) .................. 10-2006-0075273

(51) Int. Cl.
*H04K 1/00* (2006.01)
*H04L 29/06* (2006.01)
*G06F 7/04* (2006.01)
*G06F 15/16* (2006.01)
*G06F 17/30* (2006.01)

(52) U.S. Cl. ............ 380/270; 726/4; 713/155; 713/156; 713/163

(58) Field of Classification Search .................. 380/270; 726/4, 5
See application file for complete search history.

(56) References Cited

U.S. PATENT DOCUMENTS

| 7,277,729 | B2* | 10/2007 | Adachi et al. ................. 455/561 |
| 2005/0125693 | A1* | 6/2005 | Duplessis et al. ............. 713/201 |
| 2006/0239209 | A1* | 10/2006 | Ayyagari et al. ............. 370/254 |
| 2008/0034207 | A1* | 2/2008 | Cam-Winget et al. ........ 713/163 |
| 2009/0172391 | A1* | 7/2009 | Kasapidis ..................... 713/156 |
| 2009/0282238 | A1* | 11/2009 | Bichot et al. .................. 713/155 |

* cited by examiner

*Primary Examiner* — Shin-Hon Chen
(74) *Attorney, Agent, or Firm* — Stanzione & Kim, LLP

(57) ABSTRACT

A station and a method of collecting information corresponding to security. A wireless communicator transmits a request packet to search a wireless network to at least one external device and receives a response packet to the request packet. An authentication method determiner analyzes the response packet to search for at least one wireless network and determines an authentication method supported by each of the searched wireless networks. A storage unit stores the determined authentication method of each of the searched wireless networks. Thus, necessary information corresponding to security during a connection to a wireless network can be searched in advance and provided to a user.

32 Claims, 8 Drawing Sheets

<802.11 probe response packet of Frame Body>

FIG. 5

| Basic Setup – CONNECTION ATTRIBUTES OF WIRELESS NETWORK | | 510 |
|---|---|---|
| USEABLE WIRELESS NETWORK | | |
| 1. NETWORK NAME (SSID) | live | ▼ |
| 2. OPERATION MODE(operation) | Infrastructure | ▼ |
| 3. FREQUENCY | 802.11 a/b/g (5GHz,2.4GHz) | ▼ |
| 4. AD-HOC CHANNEL | Auto Setting | ▼ |
| | NEXT | CANCEL |

FIG. 6

| Security Setup - SECURITY ATTRIBUTES OF WIRELESS NETWORK | |
|---|---|
| NETWORK NAME (SSID) : | live |
| OPERATION MODE (operation) : | Infrastructure |
| SECURITY MODE (security) : | Enhanced Security ▼ |
| NETWORK AUTHENTICATION : | WPA - PSK ▼ |
| DATA ENCRYPTION : | TKIP ▼ |
| NETWORK KEY : | |

[ PREVIOUS ]  [ NEXT ]  [ CANCEL ]

< UI FOR WIRELESS NETWORK WPA-PSK >

FIG. 7

| Security Setup - SECURITY ATTRIBUTES OF WIRELESS NETWORK | |
|---|---|
| NETWORK NAME (SSID) : | think |
| OPERATION MODE (operation) : | Infrastructure |
| SECURITY MODE (security) : | Enhanced Security ▼ |
| NETWORK AUTHENTICATION : (WPA Authentication) | IEEE 802.1x ▼ |
| 802.1X AUTHENTICATION : | EAP - TLS ▼ |
| DATA ENCRYPTION : | TKIP ▼ |

[ PREVIOUS ]　[ NEXT ]　[ CANCEL ]

< UI FOR WIRELESS NETWORK 802.1X >

STATION AND METHOD OF COLLECTING INFORMATION CORRESPONDING TO SECURITY IN A WIRELESS NETWORK

CROSS-REFERENCE TO RELATED APPLICATIONS

This application claims the benefit under 35 U.S.C. §119(a) from Korean Patent Application No. 10-2006-0075273 filed on Aug. 9, 2006 in the Korean Intellectual Property Office, the entire disclosure of which is hereby incorporated in its entirety by reference.

BACKGROUND OF THE INVENTION

1. Field of the Invention

The present general inventive concept relates to a station and a method of collecting information corresponding to security. Specifically, the present general inventive concept relates to a station and a method of collecting information corresponding to security by which information necessary for security can be searched in advance during a connection to a wireless network to provide the information to a user.

2. Description of the Related Art

Devices supporting wireless communications generally require settings for wireless connections. In a wireless environment in which security is not set, settings for wireless connections may be wirelessly performed using only Service Set Identification (SSID) searched in the network. In a case of a wireless environment in which security is set, the devices require setting of security on a Wired Equivalent Protocol (WEP), Wi-Fi Protected Access-Pre Shared Key (WPA-PSK), or 802.11i level. Accordingly, a user must manually input data necessary for setting security to set security. However, if the user has a limited knowledge of setting security in a wireless network, the user does not know which security setting is necessary for the wireless search.

When a user desires to set a connection to an access point (AP) in which wireless security is set, a conventional device supporting wireless communications does not provide information necessary for wireless setting. Thus, the user has no enough knowledge of wireless security and thus suffers much inconvenience. Also, if wireless setting is wrong in the conventional device, the conventional device does not provide information related to errors to the user. Thus, the user is not able to easily understand what type of security is required for setting wireless environment, and thereby spends a large amount of time for wireless setting.

SUMMARY OF THE INVENTION

The present general inventive concept provides a station and a method of collecting necessary information corresponding to security during a search for a wireless network, to allow a user to set the wireless network without requiring the user to know the security information.

Another aspect of the present general inventive concept is to provide a station and a method of collecting information corresponding to security by which wireless security is set automatically, to prevent a user from having to set the wireless security when accessing a network in which a wireless security is set and which requires the user to set security.

Additional aspects and utilities of the present general inventive concept will be set forth in part in the description which follows and, in part, will be obvious from the description, or may be learned by practice of the general inventive concept.

The foregoing and/or other aspects and utilities of the present general inventive concept are achieved by providing a station to collect information corresponding to security in a network system, including a wireless communicator to transmit a request packet to search wireless networks in at least one external device and to receive a response packet corresponding to the request packet, an authentication method determiner to analyze the response packet to search for one or more wireless networks and to determine an authentication method supported by each of the searched wireless networks, and a storage unit to store the determined authentication method of each of the searched wireless networks.

The authentication method determiner may include a first determiner to check a Capability Information Field (CIF) of the response packet to determine whether setting of security corresponding to a connection to the wireless network is required, and a second determiner to check a Simple Security Network (SSN) field of the response packet to determine whether the search for the authentication method is to be performed using an authentication server if it is determined that the setting of the security corresponding to the connection to the wireless network is required.

If the first determiner determines that the setting of the security corresponding to the connection to the wireless network is not required, the wireless network may be determined and stored in the storage unit as a network which does not support an additional authentication method. If the second determiner that the search for the authentication method is not to be performed using the authentication server, the wireless network may be determined and stored in the storage unit as a network that requires a shared key.

If the response packet does not include the SSN field, the second determiner may determine the wireless network as a network requiring a Wired Equivalent Privacy (WEP) key, and if the response packet includes the SSN field and an authentication method supported by the external device transmitting the response packet is a Wi-Fi Protected Access-Pre Shared Key (WPA-PSK) authentication method, the second determiner may determine the wireless network as a network requiring a PSK.

If the external device that transmits the response packet does not support the Wi-Fi Protected Access-Pre Shared Key (WPA-PSK) authentication method, the second determiner may determine that a search for an authentication method of the wireless network is to be performed using the authentication server, and the wireless network may be stored as a network requiring a WPA authentication in the storage unit.

The station may further include an authentication method negotiator to attempt an 802.1x authentication and negotiating with the authentication server through the external device to collect at least one authentication method supported by the wireless network if the wireless network is stored as the network requiring the WPA authentication method.

If the authentication method transmitted from the authentication server through the external device is pre-stored, the authentication method negotiator may request another authentication method of the authentication server to perform the negotiation and store the authentication method, which is determined through the negotiation to be supported by the authentication method negotiator and the authentication server, in the storage unit.

The authentication server may be a Remote Authentication Dial-In User Service (RADIUS) server which is connected to the external device to communicate with the external device. If the search for the wireless network is performed in an infrastructure mode, the authentication method determiner may search for the wireless network using an SSID of a response packet generated by an AP (access point).

The station may further include an encryption method determiner to analyze the received response packet to determine an encryption method supported by each of the wireless networks, wherein the storage unit stores the determined encryption method of each of the wireless networks.

The authentication method determiner and the encryption method determiner may determine and collect the authentication and encryption methods during the performance of the search for the wireless network.

The station may further include an image generator to generate a security authentication image to automatically display the stored wireless networks and authentication methods supported by the wireless networks if the search for the wireless network ends and then a connection to the wireless network is requested, and a display to display the security authentication image.

The foregoing and/or other aspects and utilities of the present general inventive concept may also be achieved by providing a method of collecting information for security in a network system, including receiving a response packet to a request packet to search for one or more wireless networks, wherein the request packet is transmitted to at least one external device, analyzing the response packet to search for at least one wireless network, determining an authentication method supported by each of the searched wireless networks, and storing the determined authentication method of each of the searched wireless networks.

The determination of the authentication method supported by each of the searched wireless networks may include, checking a CIF of the response packet to determine whether setting of security corresponding to a connection to the wireless network is required, and if the setting of the security corresponding to the connection to the wireless network is required, checking an SSN of the response packet to determine whether a search for an authentication method is to be performed using an authentication server.

The method may further include if it is determined that the setting of the security corresponding to the connection to the wireless network is not required, determining and storing the wireless network as a network which does not support an additional authentication method, and if it is determined that the search for the authentication method is not to be performed using the authentication server, determining and storing the wireless network as a network that requires a shared key.

The method may further include if the response packet does not include the SSN field, determining and storing the wireless network as a network requiring a WEP key; and if the response packet includes the SSN field and an authentication method supported by the external device transmitting the response packet is a WPA-PSK authentication method, determining and storing the wireless network as a network that requires a PSK.

The method may further include if the external device transmitting the response packet does not support a WPA-PSK authentication method, determining that a search for an authentication method of the wireless network is to be performed using the authentication server, and storing the wireless network as a network requiring a WPA authentication.

The method may further include if the wireless network is stored as the network requiring the WPA authentication, attempting an 802.1x authentication and negotiating with the authentication server through the external device to determine at least one authentication method supported by the wireless network.

The method may further include receiving an authentication method from the authentication server through the external device, if the authentication method is pre-stored, requesting another authentication method of the authentication server to perform the negotiation, and storing an authentication method as an authentication method of the wireless network when the authentication method is determined through the negotiation to be supported bilaterally.

The method may further include analyzing the response packet to determine an encryption method supported by each of the wireless networks, and storing the determined authentication method of each of the wireless networks.

The method may further include requesting a connection to the wireless network if the search for the wireless network is ended, generating a security authentication image to automatically display the stored wireless networks and authentication methods supported by the stored wireless networks, and displaying the security authentication image.

The foregoing and/or other aspects and utilities of the present general inventive concept may also be achieved by providing a computer readable recording medium having embodied thereon a computer program to execute a method, wherein the method includes receiving a response packet to a request packet to search for a wireless network, wherein the request packet is transmitted to at least one external device, analyzing the response packet to search for at least one wireless network, determining an authentication method supported by each of the searched wireless networks, and storing the determined authentication method of each of the searched wireless networks.

The computer readable recording medium may further include determining and storing the wireless network as a network which does not support an additional authentication method if it is determined that the setting of the security corresponding to the connection to the wireless network is not required, and determining and storing the wireless network as a network requiring a shared key if it is determined that the search for the authentication method is not to be performed using the authentication server.

The computer readable recording medium may further include determining and storing the wireless network as a network requiring a WEP key if the response packet does not include the SSN field, and determining and storing the wireless network as a network requiring a PSK if the response packet includes the SSN field and an authentication method supported by the external device transmitting the response packet is a WPA-PSK authentication method.

The computer readable recording medium may further include determining that a search for an authentication method of the wireless network is to be performed using the authentication server if the external device transmitting the response packet does not support a WPA-PSK authentication method, and storing the wireless network as a network requiring a WPA authentication.

The foregoing and/or other aspects and utilities of the present general inventive concept may also be achieved by providing a network system, including a station to be connected to an external device through a wireless network, to automatically communicate with the external device to collect an authentication method supported by the wireless network and the external device, and to store the collected authentication method to set a security setting.

The station may generate a user interface (UI) screen to set a connected attribute and a security attribute of the wireless network corresponding to the stored authentication method.

The station may search for one of wireless networks as the wireless network to communicate with the external device.

The wireless network may include a plurality of wireless networks, the external device may include a plurality of external devices, the authentication method may include a plurality of authentication methods, and the station may automatically search for the authentication method supported by the corresponding wireless networks and the corresponding external devices.

The station may set the security setting when communicating with one of the external devices through the corresponding wireless network using the corresponding searched authentication method.

The station may automatically search for the authentication method when being connected to the network without a user manipulation.

The foregoing and/or other aspects and utilities of the present general inventive concept may also be achieved by providing a method of a network system, the method including connecting a station to an external device through a wireless network, automatically communicating with the external device to collect an authentication method supported by the wireless network and the external device, and storing the collected authentication method to set a security setting.

BRIEF DESCRIPTION OF THE DRAWINGS

These and/or other aspects and utilities of the present general inventive concept will become apparent and more readily appreciated from the following description of the embodiments, taken in conjunction with the accompanying drawings of which:

FIG. 5 is a view illustrating a first user interface (UI) screen to set connection attributes of a wireless network according to an embodiment of the present general inventive concept;

FIG. 6 is a view illustrating a second UI screen to set a Wi-Fi Protected Access-Pre Shared Key (WPA-PSK) authentication method of a wireless network according to an embodiment of the present general inventive concept;

FIG. 7 is a view illustrating a third UI screen to set an 802.1x authentication method of a wireless network according to an embodiment of the present general inventive concept.

DETAILED DESCRIPTION OF THE PREFERRED EMBODIMENTS

Figure 1:
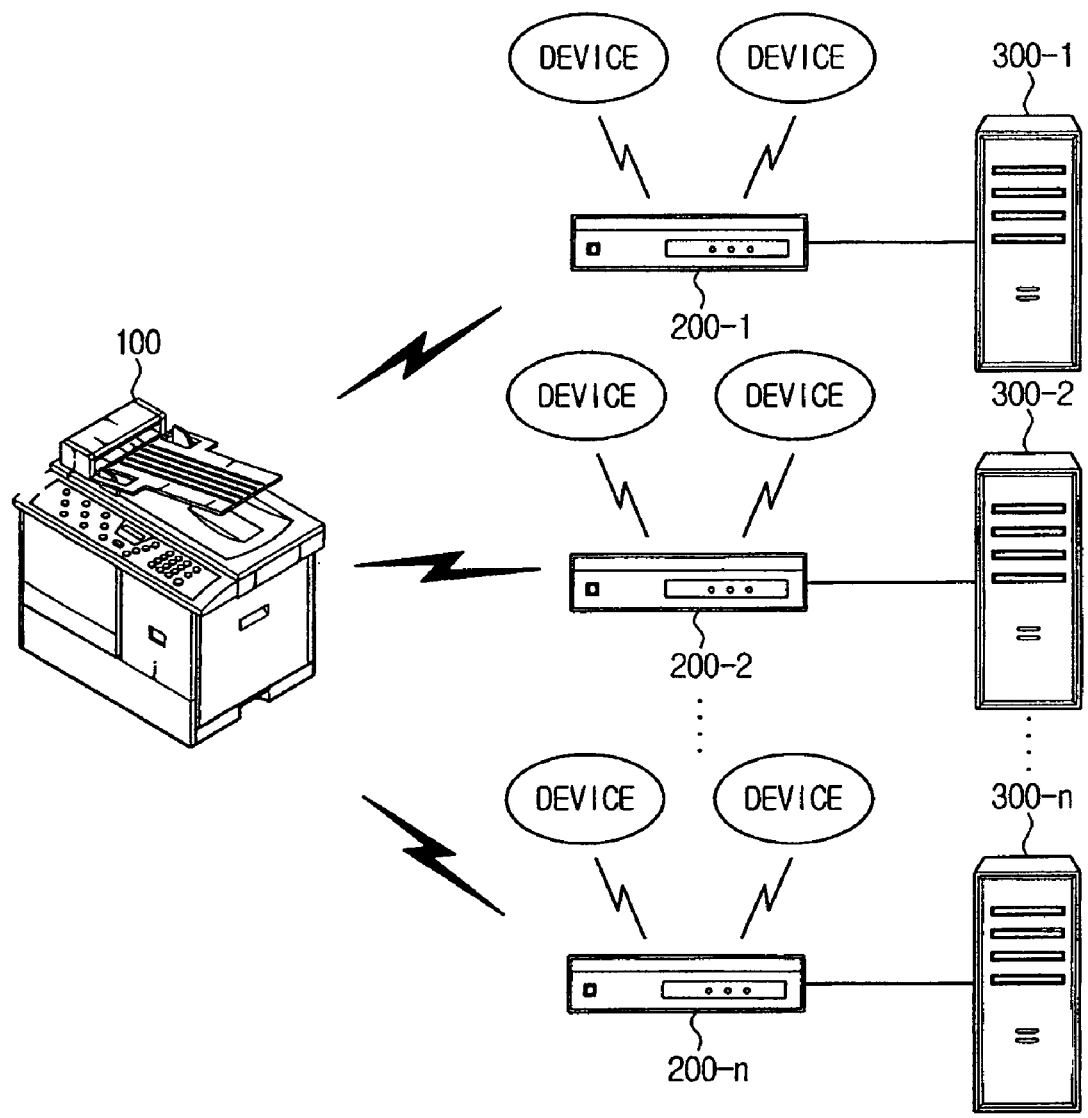
FIG. 1 is a view illustrating a wireless network system to adopt a station capable of collecting information corresponding to security according to an embodiment of the present general inventive concept.

Reference will now be made in detail to the embodiments of the present general inventive concept, examples of which are illustrated in the accompanying drawings, wherein like reference numerals refer to the like elements throughout. The embodiments are described below in order to explain the present general inventive concept by referring to the figures.

FIG. 1 is a view illustrating a wireless network system to adopt a station capable of collecting information corresponding to security according to an embodiment of the present general inventive concept. Referring to FIG. 1, the wireless network system includes a station 100, first through $n^{th}$ external devices 200-1, 200-2, . . . , and 200-n (where n is a constant), and first through $n^{th}$ authentication servers 300-1, 300-2, . . . , and 300-n (where n is a constant).

The station 100 is a device which can perform wireless communications. For example, the wireless communications may be defined in Institute of Electrical and Electronics Engineers (IEEE) 802.11 wireless local area network (LAN) standards. The station 100 may be an electronic device, i.e., an image forming device such as a printer, a scanner, a multifunction peripheral (MFP), a notebook computer, a personal computer (PC), a digital television (TV), a portable terminal, etc.

The station 100 determines and collects authentication methods necessary to set security during a search period when devices that can be connected to the wireless networks are searched. The authentication methods are supported by wireless networks respectively formed by the first through $n^{th}$ external devices 200-1, 200-2, . . . , and 200-n or the first through $n^{th}$ authentication servers 300-1, 300-2, . . . , and 300-n. If the search period ends, the collected authentication methods are automatically provided to a user interface (UI) screen. Accordingly a user does not need to manually search and input an authentication method of a wireless network with which the user desires to the user.

The first through $n^{th}$ external devices 200-1, 200-2, . . . , and 200-n are devices that form the wireless networks along with the station 100, and may include devices, access points (APs), or computers which perform wireless communications like the station 100. Other devices supporting wireless communications are respectively connected to the first through $n^{th}$ external devices 200-1, 200-2, . . . , and 200-n.

If the first through $n^{th}$ external devices 200-1, 200-2, . . . , and 200-n desire to form the wireless networks along with the station 100, security is set or is not set for the first through $n^{th}$ external devices 200-1, 200-2, . . . , and 200-n.

If the security is not set for the first through $n^{th}$ external devices 200-1, 200-2, . . . , and 200-n, the station 100 operates in an open mode in which an additional security setting is not required. If the security is set for the first through $n^{th}$ external devices 200-1, 200-2, . . . , and 200-n, the station 100 must set various types of securities such as a Wired Equivalent Protocol (WEP), a Wi-Fi Protected Access-Pre Shared Key (WPA-PSK), a WPA authentication, etc. according to security levels set for the first through $n^{th}$ external devices 200-1, 200-2, . . . , and 200-n. Accordingly, the first through $n^{th}$ external devices 200-1, 200-2, . . . , and 200-n may set wireless securities using WEP, WPA-PSK, or WPA authentication methods according to the device types. The station 100 may establish a wireless network if it supports an authentication method set in at least one of the first through $n^{th}$ external devices 200-1, 200-2, . . . , and 200-n.

Here, the WEP refers to a security protocol between a wireless LAN card and an AP, wherein the security protocol is defined according to IEEE 802.11b standards. The WPA-PSK refers to a security protocol corresponding to a wireless network which encrypts all types of data passing through the wireless network to operate, wherein the security protocol uses a shared key. The WPA is a standard devised by the wireless fidelity (Wi-Fi) Alliance to improve a security function of the WEP.

A communication mode used in a wireless LAN (WLAN) is classified into an Ad-hoc mode and an infrastructure mode. The Ad-hoc mode does not generally require high level security and thus refers to a mode in which a device-to device direct communication is performed. The infrastructure mode performs a communication using a connecting device such as access point (AP). Thus, in the infrastructure mode, the AP may be connected to an Ethernet port to constitute a wire and wireless network to use the infrastructure mode in an environment equivalent to a wire LAN. APs will be described as examples of the first through $n^{th}$ external devices 200-1, 200-2, . . . , and 200-$n$, and the wireless network system according to the present embodiment will be described as operating in the infrastructure mode.

If one of the first through $n^{th}$ external devices 200-1, 200-2, . . . , and 200-$n$ requires the WPA authentication, the first through $n^{th}$ authentication servers 300-1, 300-2, . . . , and 300-$n$ perform 802.1x authentications to virtually negotiate with the station 100 about authentication methods. The first through $n^{th}$ authentication servers 300-1, 300-2, . . . , and 300-$n$ may be Remote Authentication Dial-In User Service (RADIUS) servers which provide authentication services to the station 100.

Figure 2:
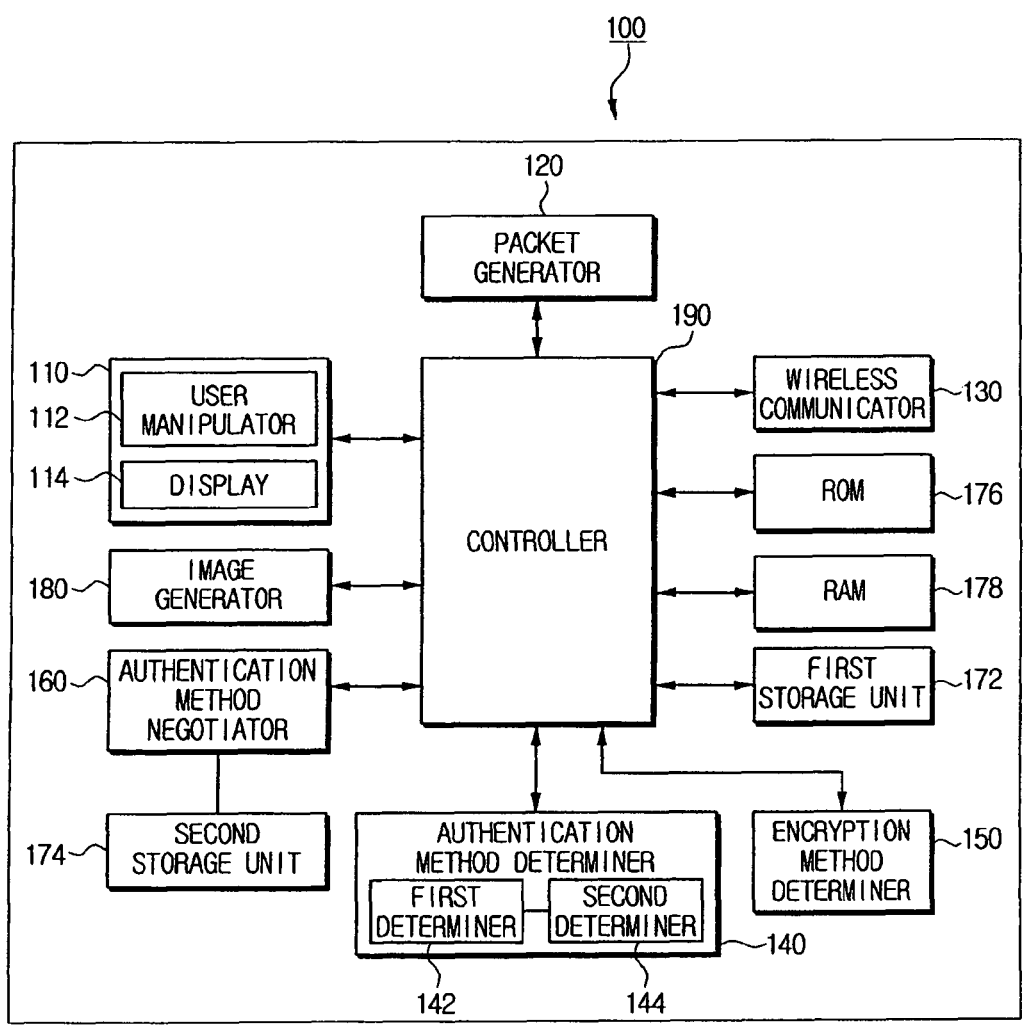
FIG. 2 is a block diagram of the station of FIG. 1 capable of collecting information corresponding to security, according to an embodiment of the present general inventive concept.

FIG. 2 is a block diagram of the station 100 of FIG. 1 capable of collecting information corresponding to security, according to an embodiment of the present general inventive concept. Referring to FIGS. 1 and 2, the station 100 includes a user interface (UI) unit 110, a packet generator 120, a wireless communicator 130, an authentication method determiner 140, an encryption method determiner 150, an authentication method negotiator 160, a first storage unit 172, a second storage unit 174, a read only memory (ROM) 176, a random access memory (RAM) 178, an image generator 180, and a controller 190. If the station 100 is an image forming device, the station 100 may further include a function block necessary to form an image. If the station 100 is a TV, the station 100 may further include a block related to viewing of a TV program. However, only blocks related to the essential points of the present general inventive concept will be illustrated and described in FIG. 2.

The UI unit 110 includes a user manipulator 112 and a display 114. The user manipulator 112 functions as an interface between a user and the station 100, requests a function supported by the station 100, and includes a touch panel, a plurality of numerical keys, a plurality of direction keys, etc.

The display 114 is a monitor realized as a cathode ray tube (CRT), a liquid crystal display (LCD), etc., and displays various UI screens generated by the image generator 180, an operation status of the station 100, etc.

If the station 100 enters into a wireless network search mode, the packet generator 120 generates a request packet to search a wireless network. Accordingly, the station 100 searches for the wireless network using the request packet. The wireless network search mode refers to a mode in which a search for a device wirelessly connected to the station 100 starts. The user may request the wireless network search mode using the user manipulator 112, or the station 100 may enter into the wireless network search mode periodically or after the station 100 is turned on and booted up.

The wireless communicator 130 transmits the request packet generated by the packet generator 120 to the first through $n^{th}$ external devices 200-1, 200-2, . . . , and 200-$n$ and receives first through $n^{th}$ response packets to the request packet from the first through $n^{th}$ external devices 200-1, 200-2, . . . , and 200-$n$, respectively. The first through $n^{th}$ response packets are provided to the authentication method determiner 140. For example, the wireless communicator 130 performs communications using a WLAN according to a protocol defined in IEEE 802.11 LAN standards.

The authentication method determiner 140 analyzes the first through $n^{th}$ response packets to search corresponding to at least one wireless network having at least one Service Set Identification (SSID) and determines and collects authentication methods respectively supported by the searched wireless networks. After the authentication method determiner 140 completely analyzes one response packet, the authentication method determiner 140 analyzes a next response packet.

The authentication method determiner 140 may functionally include first and second determiners 142 and 144 which may be realized as separate modules or an integrated module.

Figure 3:
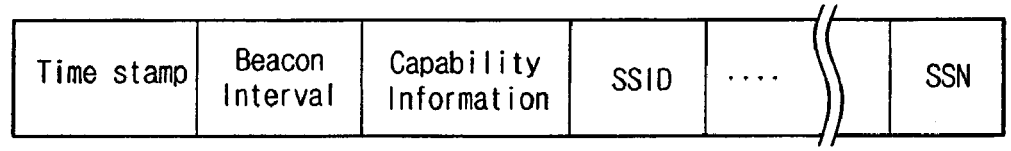
FIG. 3 is a view schematically illustrating a part of a frame body of a response packet transmitted from each of first through $n^{th}$ external devices, according to an embodiment of the present general inventive concept.

A frame body of a general response packet is divided into a plurality of fields as illustrated in FIG. 3. Referring to FIG. 3, a frame body of an 802.11 probe response packet includes a plurality of fields, i.e., a time stamp field, a beacon interval field, a capability information (CI) field, an SSID field, a simple security network (SSN) field, etc. The time stamp field indicates time information, and the CI field includes information regarding whether security has been set.

Referring to FIGS. 1 through 3, the first determiner 142 checks the first response packet transmitted from the first external device 200-1 to determine whether the first response packet includes an SSID. The SSID is a unique identifier (ID) attached to headers of packets transmitted from the first through $n^{th}$ external devices 200-1, 200-2, . . . , and 200-$n$ through the WLAN. If an SSID field of the first response packet includes an ID stream indicating the first external device 200-1, the first determiner 142 checks a value set in a common intermediate format (CIF) to determine whether setting of security for a wireless network connection between the first external device 200-1 and the station 100 is required. Hereinafter, a network formed along with the first external device 200-1 is referred to as a first wireless network.

If it is determined that the setting of the security is not required, the first wireless network is determined as a network which does not support an additional authentication method. Thus, the controller 190 may control the first storage unit 172 to store the first wireless network as a network which does not require setting of security. In other words, it is determined that the first external device 200-1 does not need additional setting of security.

If the first determiner 142 determines that the setting of the security is required, the second determiner 144 checks an SSN field to determine whether a collection of authentication methods is to be virtually performed using the first authentication server 300-1.

If a response packet does not include an SSN field, the second determiner 144 determines the first external device 200-1 to be a network that requires a wireless security setting. The controller 190 may control the first storage 172 to store the first external device 200-1 or the first wireless network as a network that requires a WEP key. The WEP key is a shared key necessary to perform an authentication between the first external device 200-1, such as an AP, and the station 100. Thus, when security is set using a WEP authentication method, the user must know the shared key such as the WEP key.

If it is determined that the response packet includes the SSN field, the second determiner 144 checks a value set in the SSN field to determine an authentication method supported by the first external device 200-1. Accordingly, it is determined that the response packet includes the SSN, and the first external device 200-1, which has transmitted the first response packet, supports a WPA-PSK authentication method, the second determiner 144 determines the first external device 200-1 to be a network that requires a PSK. Thus, the controller 190 controls the first storage unit 172 to store the first wireless network as a network requiring a PSK.

If it is determined that the response packet includes the SSN field and the first external device 200-1 supports an authentication method disclosing the WPA-PSK authentication method, the second determiner 144 determines that an authentication method of a wireless network is to be virtually searched and determines the first external device 200-1 to be a network that requires a WAP authentication. Thus, the controller 190 controls the first storage unit 172 to store the first wireless network as a network requiring a WPA authentication and tries an 802.1x authentication.

The encryption method determiner 150 analyzes the response packet to determine an encryption method supported by the first wireless network. For example, the encryption method determiner 150 may determine an encryption method from the value set in the SSN field of the response packet. The determined encryption method is stored in the first storage unit 172 to correspond to the first external device 200-1 or the first wireless network. The determination of the encryption method may be performed after the second determiner 144 determines that the response packet includes the SSN field.

The authentication method determiner 140 and the encryption method determiner 150, which have been described above, operate based on an authentication method defined in 802.11ab/g. If the first response packet is completely analyzed, and thus the authentication and encryption methods supported by the first wireless network are stored, the authentication method determiner 140 and the encryption method determiner 150 analyze a next response packet to store authentication and encryption methods supported by another wireless network. Accordingly, the authentication method determiner 140 and the encryption method determiner 150 collect authentication and encryption methods supported by each wireless network and store the collected authentication and encryption methods in the first storage unit 172.

If the wireless network formed by the first external device 200-1 is stored as a network that requires a WPA authentication according to the determination of the second determiner 144, the authentication method negotiator 160 tries the 802.1x authentication and negotiates with the first authentication server 300-1 through the first external device 200-1 to virtually collect at least one authentication method which can be supported by the wireless network.

The virtual collection of the at least one authentication method includes an operation in which the authentication method negotiator 160 operates by attempting a virtual authentication without inputting a network key of the user to receive at least one authentication method from the first authentication server 300-1. This is because the first external device 200-1 does not support a WPA-PSK or a WEP that performs an authentication using a shared key.

Figure 4:
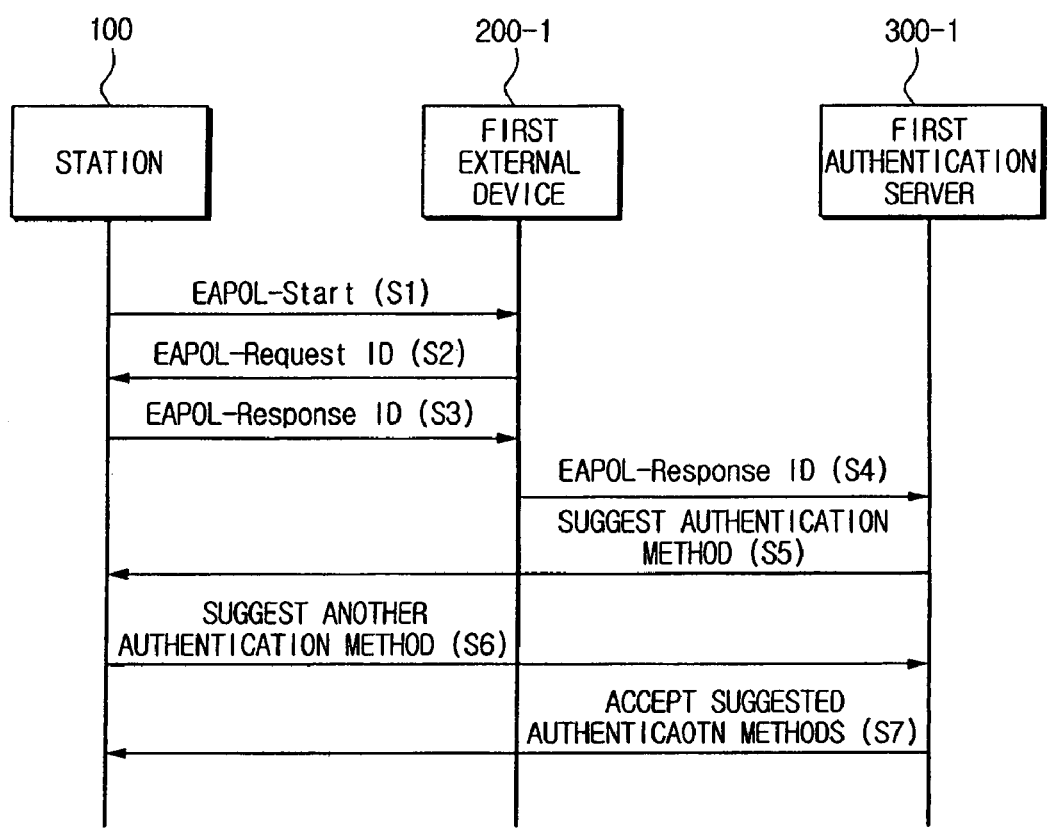
FIG. 4 is a schematic flowchart of a sequence of a virtual authentication performed in an authentication method negotiator illustrated in FIG. 2, according to an embodiment of the present general inventive concept.

FIG. 4 is a flowchart of a sequence of a virtual authentication performed by the authentication method negotiator 160 illustrated in FIG. 2, according to an embodiment of the present general inventive concept. Referring to FIGS. 1 through 4, in operation S1, the authentication method negotiator 160 generates an Extensible Authentication Protocol Over LAN-Start (EAPOL-Start) packet to confirm a start of the 802.1x authentication, and the wireless communicator 130 transmits the EAPOL-Start packet to the first external device 200-1 to request a virtual EAP authentication.

If the first external device 200-1 requests an EAPOL-Request ID of the station 100 in operation S2, the wireless communicator 130 transmits an EAPOL-Response ID of the station 100 stored in the second storage unit 1741 to the first external device 200-1 in operation S3. In operation S4, the first external device 200-1 transmits the EAPOL-Response ID of the station 100 to the first authentication server 300-1.

The first authentication server 300-1 compares the EAPOL-Response ID with an ID registered in the first authentication server 300-1 and determines whether the station 100 has been registered according to the result of comparison. If it is determined that the station 100 has been registered, the first authentication server 300-1 suggests one of a plurality authentication methods supported by the first authentication server 300-1 to the station 100 in operation S5.

The suggested authentication method is transmitted to the station 100 through the first external device 200-1. If the station 100 determines that the station 100 is able to support the suggested authentication method, the station 100 accepts the suggested authentication method. If the station 100 determines that the station 100 is unable to support the suggested authentication method, the station 100 rejects the suggested authentication method. The same process of accepting or rejecting the suggested authentication method is also carried out in the first authentication server 300-1. For example, in operation S6, the station 100 accepts the suggested authentication method and then suggests another authentication method to the first authentication server 300-1. If signals to accept the another authentication method and end a negotiation are received from the first authentication server 300-1, the station 100 and the first authentication server 300-1 have both agreed with to accept the authentication methods suggested in operations S5 and S6 in operation S7.

Examples of an EAP authentication method, which may be suggested by the station 100 or the first authentication server 300-1, include EAP-Transport Layer Security (EAP-TLS), EAP-Tunneled Transport Layer Security (EAP-TTLS), Protected EAP (PEAP), Lighted EAP methods, etc. The EAP authentication method is described in detail using EAP standards, and thus its additional description will be omitted herein. At least one EAP authentication method which can be supported by the station 100 is stored in the second storage unit 174.

The authentication method determiner 140, the encryption method determiner 150, and the authentication method negotiator 160, which have been described above, operate while a wireless network is searched, and analyze all of the first through $n^{th}$ response packets that are transmitted from the first through $n^{th}$ external devices 200-1, 200-2, ..., and 200-$n$.

Referring to FIG. 2 again, the ROM 176 stores various control programs necessary to realize the operation and function of the station 100. For example, the ROM 176 may store a plurality of programs including a program to generate a packet, a program to communicate with the first through $n^{th}$ external devices 200-1, 200-2, ..., and 200-$n$ and the first through $n^{th}$ authentication servers 300-1, 300-2, ..., and 300-$n$, a program to analyze response packets respectively transmitted from the first through $n^{th}$ external devices 200-1, 200-2, ..., and 200-$n$ to determine and collect an authentication method and an encryption method supported by the first through $n^{th}$ external devices 200-1, 200-2, ..., and 200-$n$, etc.

The RAM 178 may store a program to be executed by the controller 190 or may temporarily store data processed by the controller 190, etc., when the program is loaded from the ROM 176.

The first storage unit 172 stores the authentication and encryption methods of each wireless network determined and collected by the authentication determiner 140. Each wireless network indicates each of networks formed by the station 100 and the first through $n^{th}$ external devices 200-1, 200-2, . . . , and 200-n. The first storage unit 172 also stores a profile of each wireless network that is determined by the analysis of the response packet. A profile includes information regarding an SSID, an operation mode, a frequency, and an Ad-hoc channel and is extracted by a packet analyzer (not illustrated) or the controller 190.

If the search for the wireless network is completed and a connection to the wireless network and a setting of security are requested from the user manipulator 112, the image generator 180 generates first through third UI screens as illustrated in FIGS. 5 through 7.

FIG. 5 is a view illustrating a first UI screen to set connection attributes of a wireless network according to an embodiment of the present general inventive concept. Referring to FIG. 5, the first UI screen is a screen through which profiles, such as the name of the network (SSID), the operation mode, frequency, Ad-hoc channel, etc., are set. The image generator 180 generates the first UI screen on which one SSID is automatically displayed, using the profile of each wireless network stored in the first storage unit 172. As illustrated in FIG. 5, the SSID is displayed as "live," and the operation mode, the frequency, and the Ad-hoc channel corresponding to the SSID "live" are automatically displayed. If the user manipulates the user manipulator 112 to select "▼" 510, the image generator 180 displays SSIDs of other networks which can be wirelessly connected, besides the SSID "live."

FIG. 6 is a view illustrating a second UI screen to set a Wi-Fi Protected Access-Pre Shared Key (WPA-PSK) of a wireless network according to an embodiment of the present general inventive concept. Referring to FIG. 6, the second UI screen is a screen through which security attributes of a wireless network are set if the SSID selected on the first UI screen illustrated in FIG. 5 supports a WPA-PSK authentication method. If the SSID "live" is selected on the first UI screen illustrated in FIG. 5, the image generator 180 generates a UI screen through which an operation mode, a security mode, a network authentication method, and a data encryption method are read from the first storage unit 172 and are automatically displayed Accordingly, the operation mode, the security mode, the network authentication method, and the data encryption method are stored in the first storage unit 172 to correspond to the SSID "live." If a displayed authentication or encryption method is not supported by the station 100, the image generator 180 generates a warning message to warn the user that a wireless communication with the first external device 200-1 may not be performed or an encryption of data may not be supported. The warning message may be displayed on the display 114 of FIG. 2.

For example, if an encryption method supported by the first external device 200-1 is stored and collected as a Temporal Key Integrity Protocol (TKIP) in the first storage 172, the image generator 180 displays a data encryption method as a TKIP on the second UI screen. If the first external device 200-1 supports the TKIP and the station 100 supports an encryption method other than "TKIP" such as an Advanced Encryption Standard (AES) method, because an encryption method which is not supported by the station 100 is set, the image generator 180 generates a warning message to warn the user that an encryption may not be supported during communication with the first external device 200-1.

Accordingly, the user does not need to additionally recognize and input authentication and encryption methods supported by the first external device 200-1 having an SSID "live." Also, the user may remember and input only a network key, i.e., a shared key, to perform a wireless communication with the first external device 200-1.

FIG. 7 is a view illustrating a third UI screen to set an 802.1x authentication method of a wireless network. Referring to FIG. 7, the third UI screen is a screen through which security attributes of a wireless network are set if the SSID selected on the first UI screen illustrated in FIG. 5 supports an 802.1x authentication method. If an SSID "think" is selected on the first UI screen illustrated in FIG. 5, the image generator 180 generates a UI screen on which an operation mode, a security mode, a network authentication method, an 802.1x authentication method, and a data encryption method are read from the first storage unit 172 and automatically displayed. The operation mode, the security mode, the network authentication method, the 802.1x authentication method, and the data encryption method may be stored in the first storage unit 172 to correspond to the SSID "think."

If the authentication method negotiator 160 determines that an external device (hereinafter referred to as the second external device 200-2) that has the SSID "think" and the station 100 that supports an EAP-TLS, an EAP-TTLS, and a PEAP as an 802.1x authentication method in common, the EAP-TLS, the EAP-TTLS, and the PEAP may be stored as an authentication method corresponding to the SSID "think" in the first storage unit 172. Thus, the image generator 180 generates a UI screen through which the user selects one of EAP-TLS, EAP-TTLS, and PEAP authentication methods.

If a displayed authentication or encryption method is not supported by the station 100, the image generator 180 generates a warning message to warn the user that a wireless communication with the second external device 200-2 may not be performed or an encryption of data may not be supported. The generated warning message may be displayed on the display 114.

For example, if an encryption method supported by the second external device 200-2 is collected and stored as a TKIP in the first storage unit 172, the first storage 172 displays the TKIP as a data encryption method on the third UI screen. If the second external device 200-2 supports the TKIP and the station 100 supports an encryption method other than TKIP, such as AES encryption method, because an encryption method which is not supported by the station 100 is set, the image generator 180 generates a warning message to warn that a data encryption may not be supported during a wireless communication with the second device 200-2.

Referring to FIG. 2, the controller 190 controls the operation of the station 100 using the stored control programs and inputs and controls outputs of signals among the above-described blocks.

If a search for a wireless network is requested, the controller 190 may control the packet generator 120 and the wireless communicator 130 to generate a request packet and to transmit the request packet to the first through $n^{th}$ external devices 200-1, 200-2, . . . , and 200-n. The controller 190 may also control the authentication method determiner 140 and the encryption method determiner 150 to analyze the first through $n^{th}$ response packets that are respectively transmitted from the first through $n^{th}$ external devices 200-1, 200-2, . . . , and 200-n, and to collect profiles including the authentication and encryption methods. The controller 190 may also control the authentication method negotiator 160 to perform a virtual authentication on an external device which does not support the WPA-PSK authentication method.

The controller 190 may switch to the wireless network search mode if an entrance into a wireless network search mode is requested from the user manipulator 112, or if the station 100 is turned on and booted. In addition, the controller 190 may switch to the wireless search mode periodically at certain intervals.

The controller 190 controls the first storage unit 172 to store information collected by the authentication method determiner 140, the encryption method determiner 150, and the authentication method negotiator 160 corresponding to each of the first through $n^{th}$ external devices 200-1, 200-2, . . . , and 200-n, i.e., for each of searched wireless networks.

If the search for the wireless network ends, and a connection to the wireless network is requested, the controller 190 may control the image generator 180 and the display 114 to adaptively generate and display a UI screen as illustrated in FIG. 5, 6, or 7.

Figure 8:
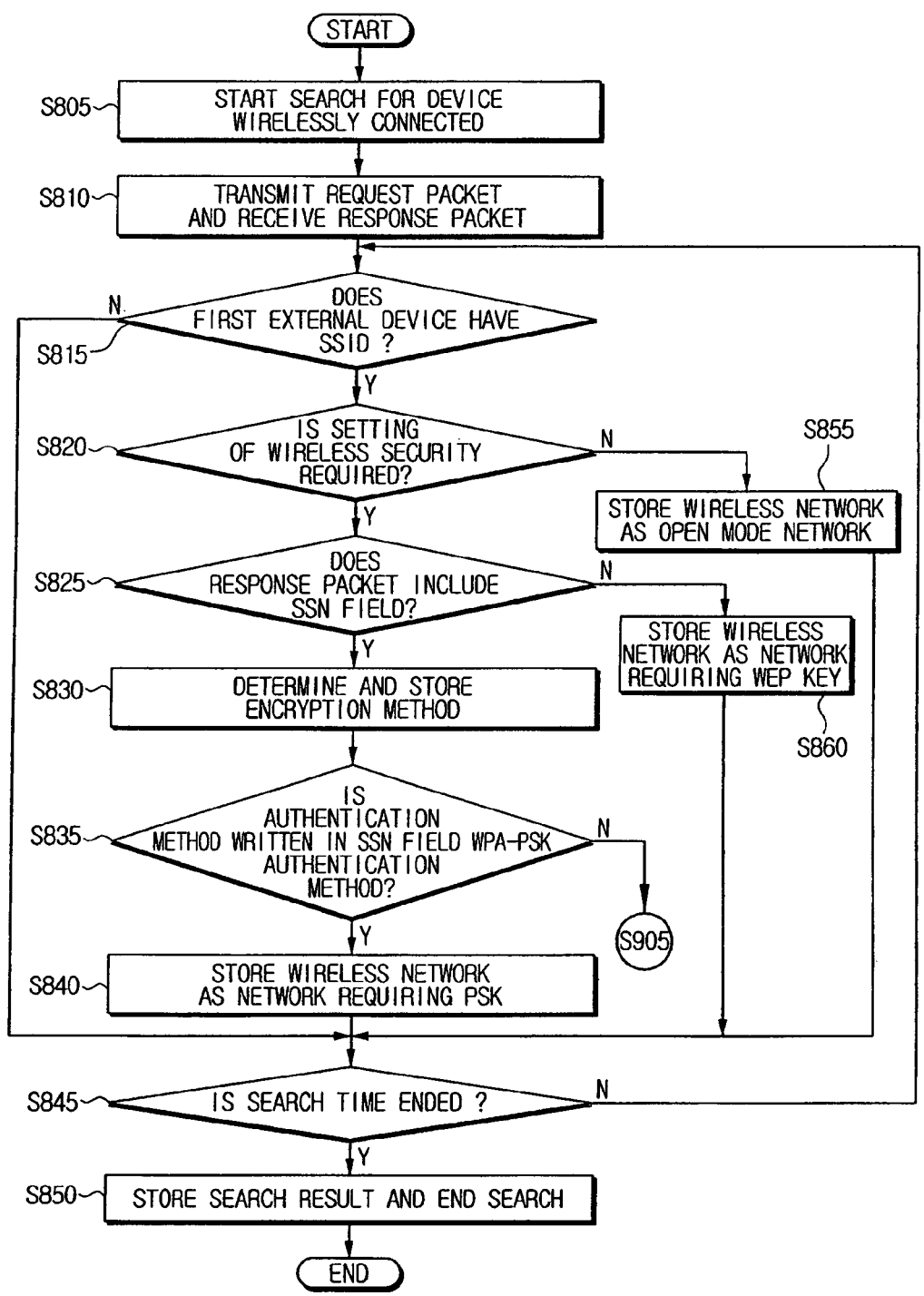
FIGS. 8 and 9 are flowcharts of a method of collecting information for security using the station illustrated in FIG. 2, according to an embodiment of the present general inventive concept.
Figure 9:
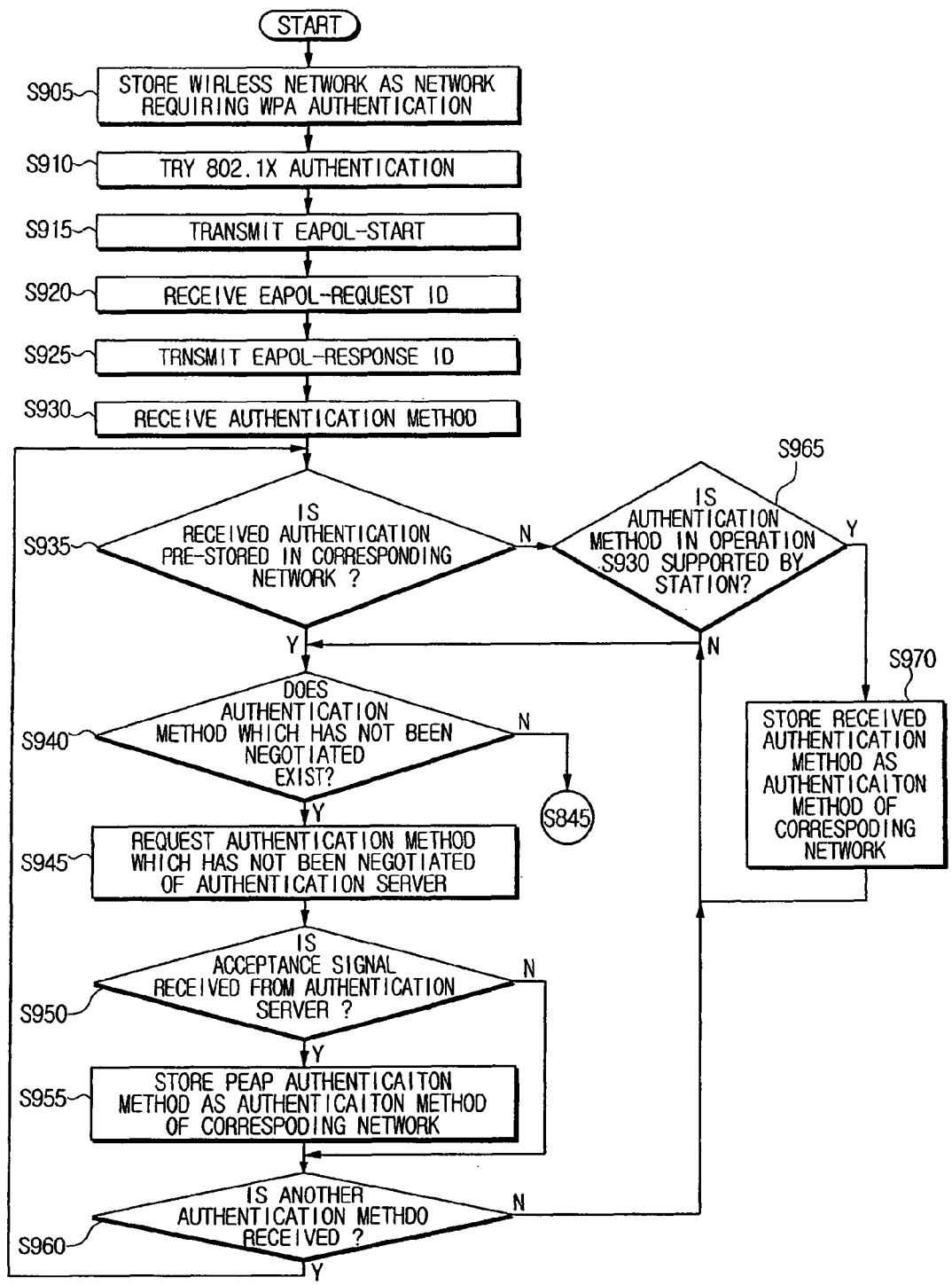

FIGS. 8 and 9 are flowcharts of a method of collecting information corresponding to security using the station 100 illustrated in FIG. 2, according to an embodiment of the present general inventive concept. Referring to FIGS. 1, 2, and 8, if a search for a wirelessly connectible device starts, i.e., if a wireless network search mode starts, in operation S805, the wireless communicator 130 transmits a request packet that is generated by the packet generator 120 to the first through $n^{th}$ external devices 200-1, 200-2, . . . , and 200-n, and receives first through $n^{th}$ response packets to the request packet from the first through $n^{th}$ external devices 200-1, 200-2, . . . , and 200-n in operation S810.

In operation S815, the first determiner 142 checks the first response packet that is transmitted from the first external device 200-1 to determine whether the first external device 200-1 has an SSID.

If it is determined in operation S815 that the first external device 200-1 has the SSID, the first determiner 142 determines whether setting of security is required to establish a wireless network connection between the first external device 200-1 and the station 100, i.e., determines whether setting of security is required to establish the first wireless network connection, in operation S820.

If it is determined in operation S820 that the setting of the security is required to establish the connection to the first wireless network, the second determiner 144 determines whether the first response packet includes an SSN field in operation S825.

If it is determined in operation S825 that the first response packet includes the SSN field, the encryption method determiner 150 determines an encryption method that is written in the SSN field, and the controller 190 controls the first storage unit 172 to store the determined encryption method in operation S830.

In operation S835, the second determiner 144 checks a value set in the SSN field to determine an authentication method supported by the first external device 200-1. If it is determined in operation S835 that the authentication method written in the SSN field is a WPA-PSK authentication method, the first wireless network is determined as a network that requires a PSK and stored in the first storage unit 172 in operation S840.

If a search time ends in operation S845, the controller 190 ends the wireless network search mode in operation S850.

If it is determined in operation S815 that the first external device 200-1 does not have the SSID, the controller 190 proceeds to operations S845 and S850.

If it is determined in operation S820 that the setting of the security is not required for the wireless network connection corresponding to the first external device 200-1, the first determiner 142 determines that the first wireless network does not support an additional authentication method, and the first storage unit 172 stores the first wireless network as an open mode network that does not require wireless security setting in operation S855.

If it is determined in operation S825 that the first response packet does not include the SSN field, the second determiner 144 determines the first wireless network as a network requiring a WEP key, and the first storage unit 172 stores the first wireless network as the network requiring the WEP key in operation S860.

Referring to FIGS. 1, 2, 8, and 9, it is determined in operation S835 that the first external device 200-1 supports an authentication method discluding the WPA-PSK authentication method, the second determiner 144 determines the first wireless network as a network that requires a WPA authentication, and the first storage unit 172 stores the first wireless network as the network requiring the WPA authentication in operation S905.

The controller 190 controls the authentication method negotiator 160 to attempt an 802.1x authentication to virtually negotiate with the first authentication server 300-1 about an authentication method in operation S910.

In operation S915, the authentication method negotiator 160 generates an EAPOL-Start packet to confirm a start of the 802.1x authentication, and the wireless communicator 130 transmits the EAPOL-Start packet to the first external device 200-1 to request a virtual EAP authentication.

If a transmission of an EAPOL-Request ID of the station 100 is requested from the first external device 200-1 in operation S920, the wireless communicator 130 transmits an EAPOL-Response ID of the station 100 stored in the second storage unit 174 to the first external device 200-1 in operation S925. The first external device 200-1 transmits the EAPOL-Response ID of the station 100 that is transmitted in operation S925 to the first authentication server 300-1.

If the first authentication server 300-1 compares the EAPOL-Response ID with a registered ID to determine that the station 100 has been registered, and an authentication method supported by the first authentication method 300-1 is received from the first authentication server 300-1 through the first external device 200-1 in operation S930, the authentication method negotiator 160 checks whether the received authentication method is an authentication method pre-stored in a corresponding network in operation S935. Accordingly, the authentication method negotiator 160 determines whether the first external device 200-1 has tried authentication in the same manner as the received authentication method.

If it is checked in operation S935 that the received authentication method is the authentication method pre-stored in the corresponding network, the authentication method negotiator 160 checks whether an EAP authentication method is stored in the second storage 174 in operation S940, where the EAP authentication method is one of a plurality of authentication methods supported by the station 100 which has not been negotiated with the first authentication server 300-1. For example, if the EAP authentication method supported by the station 100 includes EAP-TSL, EAP-TTLS, and PEAP authentication methods, and the EAP authentication method transmitted in operation S930 includes the EAP-TTLS authentication method, the authentication method negotiator 160 determines that the EAP authentication method, which has not been negotiated, includes EAP-TLS and PEAP authentication methods.

In operation S945, the authentication method negotiator 160 requests a negotiation corresponding to one of the EAP- TLS and PEAP authentication methods, for example, the PEAP authentication method, of the first authentication server 300-1.

If a signal to accept the PEAP authentication method is received from the first authentication server 300-1 in operation S950, the first storage unit 172 stores the PEAP authentication method as an authentication method of the first wireless network in operation S955.

If another authentication method is received from the first authentication server 300-1 in operation S960, operations 935 through 955 are executed. If the another authentication method is not received from the first authentication server 300-1 in operation S960, operation S940 is executed.

If the authentication method received in operation S930 is not an authentication method pre-stored to correspond to the first wireless network, the authentication method negotiator 160 determines whether the authentication method received in operation S930 is an authentication method supported by the station 100 in operation S965. If at least one EAP authentication method stored in the second storage unit 174 includes the received authentication method, the authentication method negotiator 160 determines that the received authentication method can be supported.

If it is determined in operation S965 that the authentication method received in operation S930 is the authentication method supported by the station 100, the first storage unit 172 stores the authentication method received in operation S930 as an authentication method of the corresponding network, i.e., the first wireless network in operation S970, and the authentication method negotiator 160 proceeds to operation S940.

If it is determined in operation S965 that the authentication method received in operation S930 is not the authentication method supported by the station 100, the authentication method negotiator 160 proceeds to operation S940.

If it is determined in operation S940 that there is no authentication method which is not negotiated, the controller 190 executes operation S845 of FIG. 8.

Accordingly, the analysis of the SSID that is transmitted from the first external device 200-1 and the collection and storage of necessary information corresponding to a wireless connection of the first external device are completed. A wireless network formed by one SSID has been described with reference to FIGS. 8 and 9. However, the controller 190 repeatedly executes the above-described operations to sequentially analyze SSIDs transmitted from the second through $n^{th}$ external devices 200-2, . . . , and 200-n to collect wireless authentication methods supported by the second through $n^{th}$ external devices 200-2, . . . , and 200-n.

The present general inventive concept can also be embodied as computer-readable codes on a computer-readable recording medium. The computer-readable recording medium is any data storage device that can store data which can be thereafter read by a computer system. Examples of the computer-readable recording media include read-only memory (ROM), random-access memory (RAM), CD-ROMs, magnetic tapes, floppy disks, optical data storage devices, and carrier waves (such as data transmission through the Internet). The computer-readable recording medium can also be distributed over network-coupled computer systems so that the computer-readable code is stored and executed in a distributed fashion. Also, functional programs, codes, and code segments to accomplish the present general inventive concept can be easily construed by programmers skilled in the art to which the present general inventive concept pertains.

As described above, a station and a method of collecting information corresponding to security according to the present general inventive concept may include collecting necessary information corresponding to security during a connection to a wireless network during a search for a wireless network. Thus, a user can automatically provide necessary information to solve a trouble to directly select or input information such as an authentication method during a substantial connection to a wireless network.

Information including an authentication method necessary to establish wireless security setting can be collected and stored in a search for a wireless network. Thus, additional time to search an authentication method is not required.

Also, the present general inventive concept can be usefully applied when the user does not know information, such as the authentication method necessary to establish the wireless security setting.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. A station to collect information corresponding to security in a network system, comprising:
   a wireless communicator to transmit a request packet to search one or more wireless networks in at least one external device and to receive a response packet to the request packet;
   an authentication method determiner to analyze the response packet to search for one or more wireless networks and to determine an authentication method supported by each of the searched wireless networks; and
   a storage unit to store the determined authentication method of each of the searched wireless networks,
   wherein the authentication method determiner determines whether setting of security corresponding to a connection to the wireless network is required and determines whether the search for the authentication method is to be performed using an authentication server if it is determined that the setting of the security corresponding to the connection to the wireless network is required, and
   wherein an authentication method negotiator of the station attempts a virtual authentication of a connection to the wireless network without providing a network key to receive at least one authentication method from the authentication server according to a determination result of the authentication method determiner according to a determination result of the authentication method determiner.

2. The station of claim 1, wherein the authentication method determiner comprises:
   a first determiner to check a Capability Information Field (CIF) of the response packet to determine whether setting of security corresponding to a connection to the wireless network is required; and
   a second determiner to check a Simple Security Network (SSN) field of the response packet to determine whether the search for the authentication method is to be performed using an authentication server if it is determined that the setting of the security corresponding to the connection to the wireless network is required.

3. The station of claim 1, wherein:
   the wireless network is determined and stored in the storage unit as a network which does not support an additional authentication method if the first determiner determines that the setting of the security corresponding to the connection to the wireless network is not required, and
   the wireless network is determined and stored in the storage unit as a network that requires a shared key if the second determiner determines that the search for the authentication method is not to be performed using the authentication server.

4. The station of claim 1, wherein:
the second determiner determines the wireless network as a network requiring a Wired Equivalent Privacy (WEP) key if the response packet does not include the SSN field; and
the second determiner determines the wireless network as a network requiring a PSK if the response packet includes the SSN field and an authentication method supported by the external device that transmits the response packet is a Wi-Fi Protected Access-Pre Shared Key (WPA-PSK) authentication method.

5. The station of claim 1, wherein:
the second determiner determines that a search for an authentication method of the wireless network is to be performed using the authentication server; and
the wireless network is stored as a network requiring a WPA authentication in the storage unit if the external device that transmits the response packet does not support the Wi-Fi Protected Access-Pre Shared Key (WPA-PSK) authentication method.

6. The station of claim 5, further comprising:
an authentication method negotiator to attempt an 802.1x authentication and to negotiate with the authentication server through the external device to collect at least one authentication method supported by the wireless network if the wireless network is stored as the network that requires the WPA authentication method.

7. The station of claim 6, wherein the authentication method negotiator requests another authentication method of the authentication server to perform the negotiation and stores the authentication method, which is determined through the negotiation to be supported by the authentication method negotiator and the authentication server, in the storage unit if the authentication method that is transmitted from the authentication server through the external device is pre-stored.

8. The station of claim 6, wherein the authentication server is a RADIUS (Remote Authentication Dial-In User Service) server which is connected to the external device to communicate with the external device.

9. The station of claim 1, wherein the authentication method determiner searches for the wireless network using an SSID of a response packet generated by an AP (access point) if the search for the wireless network is performed in an infrastructure mode.

10. The station of claim 1, further comprising:
an encryption method determiner to analyze the received response packet to determine an encryption method supported by each of the wireless networks, wherein the storage unit stores the determined encryption method of each of the wireless networks.

11. The station of claim 10, wherein the authentication method determiner and the encryption method determiner determine and collect the authentication and encryption methods during the performance of the search for the wireless network.

12. The station of claim 1, further comprising:
an image generator to generate a security authentication image to automatically display the stored wireless networks and authentication methods supported by the wireless networks if the search for the wireless network ends and then a connection to the wireless network is requested; and
a display to display the security authentication image.

13. A method of collecting information corresponding to security in a network system, comprising:
receiving a response packet to a request packet to search for one or more wireless networks, wherein the request packet is transmitted to at least one external device;
analyzing the response packet to search for at least one wireless network;
determining an authentication method supported by each of the searched wireless networks; and
storing the determined authentication method of each of the searched wireless networks,
wherein the determining determines whether setting of security corresponding to a connection to the wireless network is required, and determines whether a search for an authentication method is to be performed using an authentication server if the setting of the security corresponding to the connection to the wireless network is required, and attempting a virtual authentication of a connection to the wireless network with an authentication method negotiator of the station without providing a network key to receive at least one authentication method from the authentication server according to a determination result of the determining.

14. The method of claim 13, wherein the determination of the authentication method supported by each of the searched wireless networks comprises:
checking a Capability Information Field (CIF) of the response packet to determine whether setting of security corresponding to a connection to the wireless network is required; and
checking an Simple Security Network (SSN) of the response packet to determine whether a search for an authentication method is to be performed using an authentication server if the setting of the security corresponding to the connection to the wireless network is required.

15. The method of claim 14, further comprising:
determining and storing the wireless network as a network which does not support an additional authentication method if it is determined that the setting of the security corresponding to the connection to the wireless network is not required; and
determining and storing the wireless network as a network requiring a shared key if it is determined that the search for the authentication method is not to be performed using the authentication server.

16. The method of claim 14, further comprising:
determining and storing the wireless network as a network requiring a WEP key if the response packet does not include the SSN field; and
determining and storing the wireless network as a network requiring a PSK if the response packet includes the SSN field and an authentication method supported by the external device transmitting the response packet is a WPA-PSK authentication method.

17. The method of claim 16, further comprising:
determining that a search for an authentication method of the wireless network is to be performed using the authentication server if the external device transmitting the response packet does not support a WPA-PSK authentication method; and
storing the wireless network as a network requiring a WPA authentication.

18. The method of claim 17, further comprising:
attempting an 802.1x authentication if the wireless network is stored as the network requiring the WPA authentication; and
negotiating with the authentication server through the external device to determine at least one authentication method supported by the wireless network.

19. The method of claim 18, further comprising:
receiving an authentication method from the authentication server through the external device;
requesting another authentication method of the authentication server to perform the negotiation if the authentication method is pre-stored; and
storing an authentication method as an authentication method of the wireless network, when the authentication method is determined through the negotiation to be supported bilaterally.

20. The method of claim 13, further comprising:
analyzing the response packet to determine an encryption method supported by each of the wireless networks; and
storing the determined authentication method of each of the wireless networks.

21. The method of claim 13, further comprising:
generating a security authentication image to automatically display the stored wireless networks and authentication methods supported by the stored wireless networks if the search for the wireless network ends and then a connection to the wireless network is requested; and
displaying the security authentication image.

22. A non-transitory computer readable recording medium having embodied thereon a computer program to execute a method, wherein the method comprises:
receiving a response packet to a request packet to search for a wireless network, wherein the request packet is transmitted to at least one external device;
analyzing the response packet to search for at least one wireless network;
determining an authentication method supported by each of the searched wireless networks;
attempting a virtual authentication of a connection to the wireless network without providing a network key to receive at least one authentication method from an authentication server according to a determination result of the determining; and
storing the determined authentication method of each of the searched wireless networks, by:
determining and storing the wireless network as a network which does not support an additional authentication method if it is determined that the setting of the security corresponding to the connection to the wireless network is not required; and
determining and storing the wireless network as a network requiring a shared key if it is determined that the search for the authentication method is not to be performed using the authentication server.

23. The non-transitory computer readable recording medium of claim 22, the method further comprising:
determining and storing the wireless network as a network which does not support an additional authentication method if it is determined that the setting of the security corresponding to the connection to the wireless network is not required; and
determining and storing the wireless network as a network requiring a shared key if it is determined that the search for the authentication method is not to be performed using the authentication server.

24. The non-transitory computer readable recording medium of claim 22, the method further comprising:
determining and storing the wireless network as a network requiring a WEP key if the response packet does not include the SSN field; and
determining and storing the wireless network as a network requiring a PSK if the response packet includes the SSN field and an authentication method supported by the external device transmitting the response packet is a WPA-PSK authentication method.

25. The non-transitory computer readable recording medium of claim 22, the method further comprising:
determining that a search for an authentication method of the wireless network is to be performed using the authentication server if the external device transmitting the response packet does not support a WPA-PSK authentication method; and
storing the wireless network as a network requiring a WPA authentication.

26. A network system, comprising:
a station to be connected to an external device through a wireless network, to automatically communicate with the external device to collect an authentication method supported by the wireless network and the external device, to determine whether a search for the authentication method is to be performed using an authentication server, to attempt a virtual authentication of a connection to the wireless network without providing a network key to receive at least one authentication method from the authentication server according to a determination result of the determining, and to store the collected authentication method to set a security setting.

27. The network system of claim 26, wherein the station generates a user interface (UI) screen to set a connected attribute and a security attribute of the wireless network corresponding to the stored authentication method.

28. The network system of claim 26, wherein the station searches for one of wireless networks as the wireless network to communicate with the external device.

29. The network system of claim 26, wherein:
the wireless network comprises a plurality of wireless networks;
the external device comprises a plurality of external devices;
the authentication method comprises a plurality of authentication methods; and
the station automatically searches for the authentication method supported by the corresponding wireless networks and the corresponding external devices.

30. The network system of claim 26, wherein the station sets the security setting when communicating with one of the external devices through the corresponding wireless network using the corresponding searched authentication method.

31. The network system of claim 26, wherein the station automatically searches for the authentication method when being connected to the network without a user manipulation.

32. A method of a network system, the method comprising:
connecting a station to an external device through a wireless network;
automatically communicating with the external device to collect an authentication method supported by the wireless network and the external device and determining whether a search for the authentication method is to be performed using an authentication server;
attempting a virtual authentication of a connection to the wireless network with an authentication method negotiator of the station without providing a network key to receive at least one authentication method from the authentication server according to a determination result of the determining; and
storing the collected authentication method to set a security setting.

* * * * *